United States Patent [19]

Chick

[11] 4,357,961
[45] Nov. 9, 1982

[54] PIPELINE REPAIR KIT

[76] Inventor: Douglas K. Chick, Bayshill Cottage, Barnett La., Ellstreet, Hertfordshire, England

[21] Appl. No.: 128,588

[22] Filed: Mar. 10, 1980

[30] Foreign Application Priority Data

May 14, 1975 [GB] United Kingdom ............... 20248/75

[51] Int. Cl.³ ............................................. F16L 55/18
[52] U.S. Cl. ....................................... 138/97; 138/99; 206/219; 206/221; 206/223; 206/225; 206/568; 206/582; 285/15
[58] Field of Search .................... 138/97, 99; 206/219, 206/221, 223, 225, 568, 582, 484; 285/15

[56] References Cited

U.S. PATENT DOCUMENTS

| 1,541,299 | 6/1925 | Walters | 206/219 |
| 3,064,802 | 11/1962 | Jess et al. | 206/219 |
| 3,375,822 | 4/1968 | Rose | 206/219 |
| 3,394,738 | 7/1968 | Baron et al. | 138/99 X |
| 3,809,224 | 5/1974 | Greenwood | 206/219 |
| 3,847,722 | 11/1974 | Kistner | 138/97 X |

FOREIGN PATENT DOCUMENTS 1307459 2/1973 United Kingdom ................ 206/219

Primary Examiner—James E. Bryant, III
Attorney, Agent, or Firm—Fred Philpitt

[57] ABSTRACT

A pipeline repairing kit comprising (a) a sealed, flexible envelope; (b) two removable means dividing said envelope into at least first, second and third compartments, said means being removable selectively to connect the first and second and third compartments without opening the sealed envelope; (c) measured quantities of the parts of a two-part curable resin system in the first and second compartments; and (d) an elongated flexible bandage member made of absorbent material disposed in said third compartment, said member including an integral closeable vent, whereby an elongated resin-soaked flexible bandage member adapted for wrapping around a pipeline can be provided by first removing the removable means between said first and second compartments to thereby mix the parts of the resin system, next removing the other removable means and bringing the mixed resin into intimate contact with said elongated flexible member, and then manually manipulating the envelope so as to thoroughly impregnate said bandage member with mixed resin before the envelope is opened.

1 Claim, 14 Drawing Figures

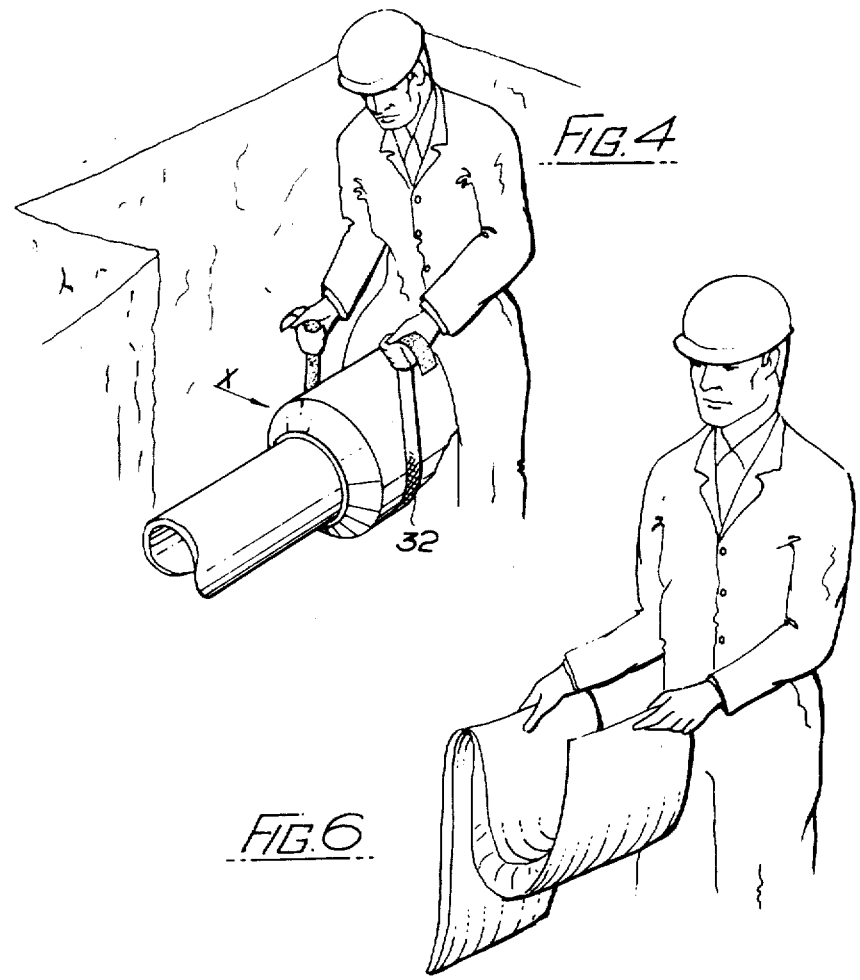
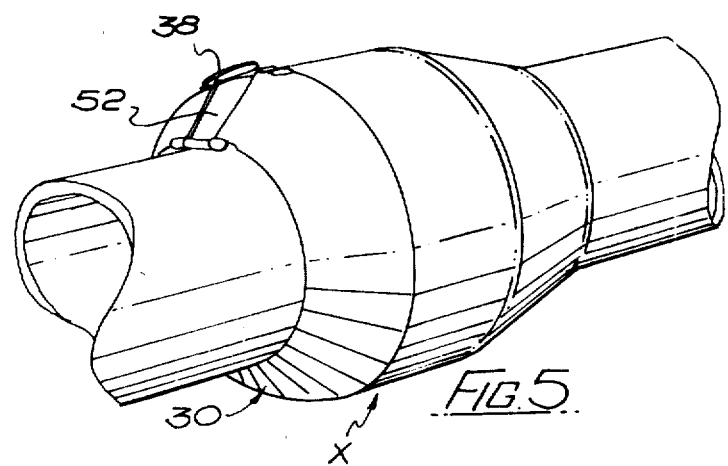

PIPELINE REPAIR KIT

This invention relates to the art of repairing defects, such as leaks in pipes and pipelines, and also holes in vessels, and to apparatus for use in connection with the method. The present application is in continuation-in-part of Application Ser. No. 900,372 which is a continuation of Application Ser. No. 686,334, both of said Applications 900,372 and 686,334 being now abandoned.

A particular application of the invention concerns the repairs of a leak in a pipeline which carries a fluent medium under pressure, and in relation to which it is not possible or practicable to stop the flow of the fluent medium whilst the leak is being repaired. Such an application may be for example, the repair of a leak in a pipeline which carries natural or town gas. When there is a leak in such a pipeline, because the gas is toxic and combustible, a potentially dangerous situation has arisen. Frequently, the leak will be such as not normally to justify replacement of the pipeline section in which the leak exists, but in actual fact in practice this is what happens, as heretofore efficient leak repairing methods have not been available. Also, when a pipeline section has to be replaced, it is necessary to shut off the flow of gas, whilst repairs are effected, which means that many homes may be without gas for a long period, which is inconvenient and leads to the incurrment of extra costs. The most common location in a pipeline for a leak to occur, is at a joint, and leaks at joints can be more difficult to repair than when the leak occurs in the pipeline between joints.

In one known method for sealing leaks in pipelines carrying fluent medium under pressure, a pair of rigid cocoon shells are placed around the pipeline in the vicinity of the leak. One of these shells has an integral vent. The shells when on the pipe are wrapped by means of an absorbent bandage which is impregnated with a curable synthetic resin. The resin forms the sealing medium for the shells, and the leaking gas escapes through the vent. When the resin sets hard, sealing the shells together and to the pipeline, the vent is sealed completing the repair. Moreover, different shells are required for different signs and types of joints and the method cannot be adopted in special areas such as valves and tee-junctions.

This known method has several disadvantages, one being that the shells, being rigid, must be a reasonably neat fit on the pipeline, otherwise effective sealing of the shells to the pipeline will not be possible. Also, the rigid shells are space consuming, and the transportation of many of the shells is difficult.

The present invention aims to provide a method of repairing leaks in pipelines whereby the aforesaid disadvantages are obviated or mitigated.

In accordance with a first aspect of the invention, a leak in a pipeline is repaired by wrapping around the pipe a flexible bandage consisting of or including resin absorbent material, said bandage including a vent means firmly secured thereto providing an easy access route for the medium leaking from the joint, the method further including soaking the absorbent material in curable resin before or after application of the bandage, allowing or effecting curing of the resin, and finally sealing said vent. By the aforesaid method, it will be seen that an effective seal can be provided without the fear of gas or other fluid medium such as water along the pipeline being terminated.

The bandage preferably comprises a layer of resin absorbent material and a stretchable plastics material film to which the vent means is sealingly secured.

Upon initial wrapping of the pipeline, usually at a joint the medium leaks freely through the vent means, so that the leaking medium does not tend to force its way past the resin soaked layers, and eventually the vent is sealed when the resin has cured sufficiently.

Preferably, the absorbent material is fibrous felt, and it is preferred that the stretchable plastics sheet is of polyurethane of a thickness of the order of one (1) thousandth of an inch. The vent means may be a short length of tubing which passes through a hole in the bandage and is bonded in an air tight manner to the film by means of polyamide or polyurethane or epoxy resin; polyurethane resin is also used for soaking the absorbent layers.

Preferably also, the method includes applying a second layer of stretchable plastics material, normally polyurethane resin of two thousandths of an inch thick over the bandage after it has been applied to the pipe and before the resin on the absorbent material is cured, the said plastics material being tensioned so as to hold the bandage tightly in contact with the pipe.

Preferably, the method includes soaking the absorbent material of the bandage with resin before application of the bandage to the pipeline, and to this end in accordance with another aspect of the invention, the bandage is contained in one compartment of a sealed envelope which contains in another compartment the said resin; the two compartments can be connected without opening the envelope so that the resin is brought into contact with the bandage; the envelope is manipulated manually thereby to impregnate the resin absorbent material of the bandage prior to opening of the envelope and utilization of the bandage as aforesaid.

The invention also provides an apparatus for use in the repair of pipe leaks and other damage in other articles comprising a sealed envelope defining first, second and third compartments therein, a flexible bandage of resin absorbent material contained in the first compartment, a first part of a multi-part resin in the second compartment and a second part of a multi-part resin in the third compartment, removable means isolating the first, second and third compartments preventing said resin parts from coming into contact with each other and the bandage until the required time, said means being removable sequentially to establish communication between the second and third compartments without opening the said envelope, whereby firstly resin parts can be brought into intimate contact and secondly the mixed resin can be contacted with thoroughly to soak said bandage by manual manipulation before opening of the envelope to use the bandage.

The resins which are used in connection with the apparatus of the invention are multi-part resins. That is to say two or more constituents or parts of the resins must be brought together to initiate curing. For example, if the resin is an epoxy, basically the parts are a resin part and a hardener. If the resin is a polyurethane, the parts are a resin part and an isocyanate. The resin may be a three or even four part resins, additional parts being catalysts and or accelerators and retarders.

Thus, in a further embodiment of the invention, the envelope may have four or more compartments with appropriate additional resin parts contained in said additional compartments, appropriate additional removable means being provided so that the resin parts can be brought together and mixed, before the resulting mixture is applied to the bandage, all before opening of the envelope.

The bandage may be an elongated wrapping member, or it may be a patch.

The bandage preferably comprises a layer of resin absorbent material and a stretchable plastics material film.

The bandage may have a vent means so that it can be used in the method as aforesaid.

The invention also envisages the use of a bandage which has no vent means. This can be used for sealing pipe joints when the flow of the fluent medium through the pipe can be terminated without difficulty or for making pipe joints. Also the bandage can be used for example for repairing holes in vessels, repairing motor vehicle bodies, or other containers, the soaked bandage being applied in the nature of a patch, and the resin allowed to cure.

The package may be a flexible sachet divided into the compartments by removable clips or the like, being in one example complimentary pairs of strip plastics material.

An embodiment of the invention will now be described, by way of example, with reference to the accompanying drawings, wherein.

Figure 2:
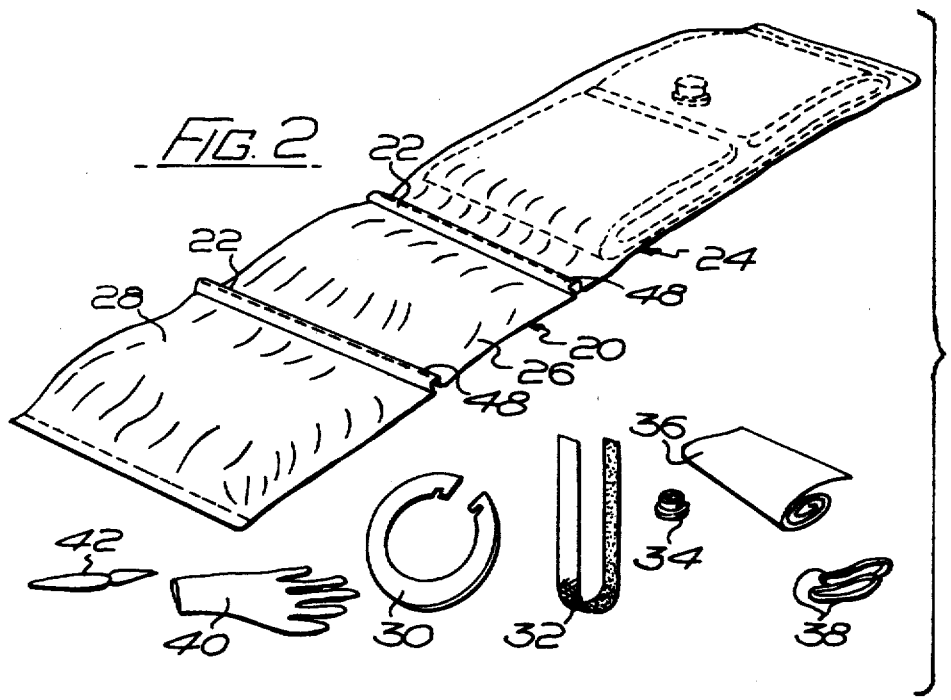
FIG. 2 is a perspective view of the components of a kit, including a bandage as shown in FIG. 1 for the repairing of a leak in a pipe joint.
Figure 3:
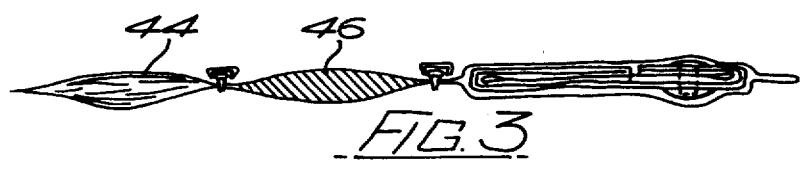
Figure 3A:
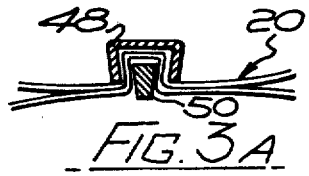
Figure 12:
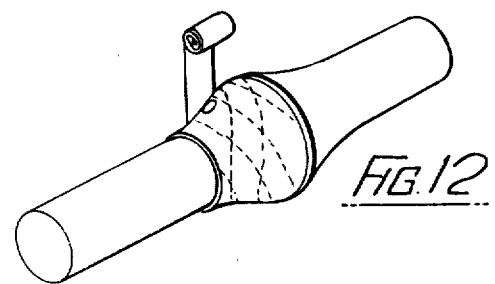
Figure 13:
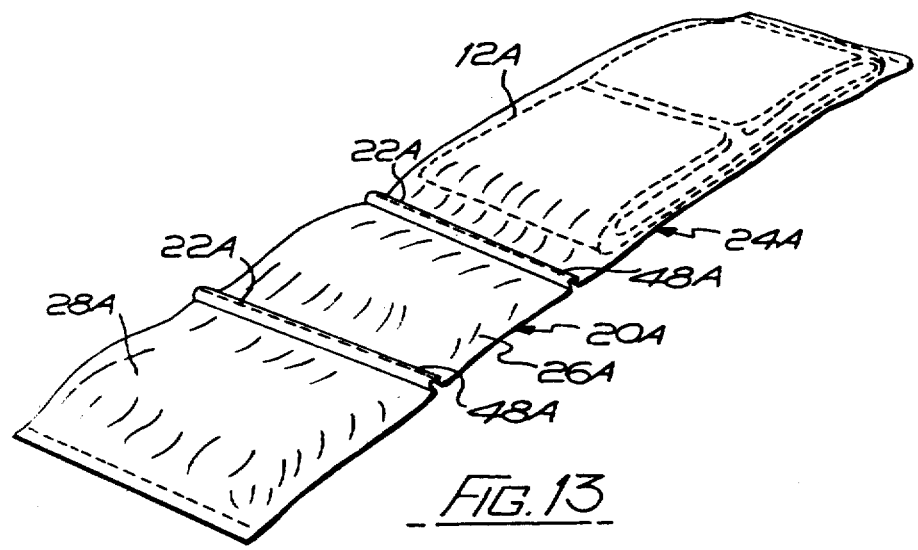

FIGS. 3 and 3A respectively are sectional elevations of the package of the kit shown in FIG. 2; and the detail ringed in FIG. 3;

FIGS. 4 to 12 illustrate respectively, and in perspective view, the steps involved in applying the wrapping to a leaking pipe joint; and FIG. 13 shows a package according to another embodiment of the invention, in a view similar to FIG. 2.

Figure 1:
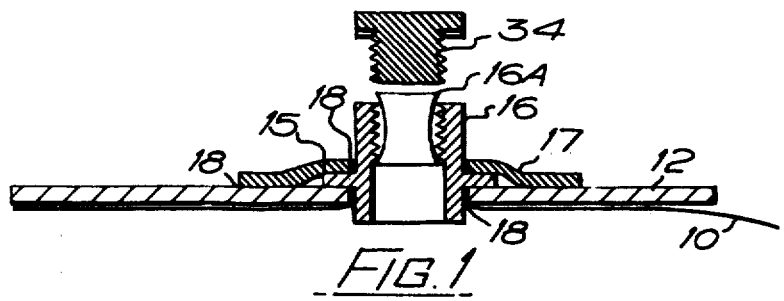
FIG. 1 is an elongated section elevation of part of a bandage according to the embodiment.

Referring to the drawings, and firstly to FIG. 1, a bandage for use in the invention is shown in section, and will be seen to comprise a layer of stretchable plastics film 10, in this case a polyurethane film of a thickness of approximately one (1) thousandth of an inch. On one side of the film 10 is an absorbent layer 12, this absorbent layer in this example being of polypropylene felt. A vent in the form of a short, internally threaded cylindrical bush 16 having a liner 16A passes completely through the laminate as shown, and is bonded to the film 10 and also to the felt layer 12 by means of polyurethane resin indicated by reference numeral 18. The felt 12 is attached to a collar 15 integral with bush 16 and a felt disc 17 (which is also optional) is placed over collar 15 (which is optional) as shown. The polyurethane resin which is also applied at the outer and inner edges of disc 17, serves not only to anchor the sleeve 16 to the laminate, but also effects a gas tight seal at the sleeve 16.

FIG. 2 shows a kit which is for use in repairing a leak at a pipe joint such as is illustrated generally by the reference numeral X in FIG. 4. The kit comprises a package 20 of which a sectional elevation is illustrated in FIG. 3 and in detail in FIG. 3A, and this package contains the bandage described with reference to FIG. 1. The package 20 is in fact a sealed sachet bag or envelope of a three layer material comprising nylon-surlin-polythene. Transversely of the length of the bag the sides are clipped together by means of plastic clips 22 so that in fact the bag is divided into three separate compartments 24, 26 and 28. Compartment 24 contains the bandage of FIG. 1 whilst compartment 26 contains one part of the resin to be applied to the bandage and compartment 28 contains the other part of the resin, such as a hardener for the resin in compartment 26. The resin system it will be appreciated is a two part system, and in actual fact is a polyurethane resin system. The clips 22 serve to keep the resin parts separate and out of contact with the bandage in compartment 24 until such times as the bandage is to be used, when the clips 22 are removed in sequence permitting first the two parts of the resin system to intermix and secondly to enable the resin system to soak the wrapping as will be explained hereinafter.

The surlin of the bag gives the bag a puncture proof property, and the polythene, which is the inner layer, is inert to the resin catalyst or hardener contained in compartment 28.

For some hardeners, the compartment 28 is lined with a sleeve of metal foil or the like, the ends being sealed closed by clips 22, to stop the ingress of moisture to such an extent as to cause contamination of the hardener. When a polyurethane resin system is used the whole package 20 is contained within a foil bag containing a dessicant such as silica gel to extend the shelf life up to two years.

In addition, the kit contains a collar 30 for fitting round pipe joint X as will be explained, an abrasive cleaning strip 32 for cleaning the pipe joint prior to application of the wrapping, a sealing plug 34 for sealing the vent means, a wrapping strip 36 of polyurethane film, elastic bands 38 for holding the collar 30 in position until the wrapping has been applied, gloves 40 for the operator's use, a knife 42 for sliting the bag 20 at the appropriate time as will be explained, and, when a polyurethane system is used, a tin of primer, and a disposable paint brush for applying same.

FIG. 3 shows a section through the bag 20, the hardener and resin being indicated at 44 and 46. The compartments 24, 26 and 28 are formed by clipping the faces of the bag together by means of the clipping arrangement shown in FIG. 3. This comprises a plastics material strip of tapered U section 48 and an inner wedge strip 50 which fits in the U section, trapping the layers of the bag 20 therebetween and effectively sealing the compartments 28, 26 and 24 one from another. In order to interconnect the compartments, it is simply a matter of removing the clipping arrangement 22 either by sliding the strips 48 and 50 one relative to another, or by springing off strip 48.

The collar 30 is of cardboard.

The felt material used for the layer 12 is needled felt.

In order to repair a pipe joint, the joint region is first of all cleaned using the abrasive strip 32 as shown in FIG. 4. It will be noticed in this figure that an excavation around the pipe joint has been shown to enable access thereto by an operator.

Referring now to FIG. 5, the collar 30 is shown in position. It is to be noted that the collar is split, the ends are sprung apart to allow it to be positioned as shown, and eventually the ends are held adjacent by means of the elastic bands 38. It is to be noted that the collar is designed to leave a gap 52 into which the vent tube 16 can fit in the subsequent application of the bandage. The purposes of the collar 30 are to maintain a leakage path to the vent tube 16 to provide a more suitable profile for supporting the bandage, and to allow a greater deflection of the joint without failure.

FIG. 6 illustrates the next stage of the method. The operator removes the clip 22 of the package 20 separating compartments 28 and 26 to allow the two parts of the polyurethane resin system to mix, and indeed he promotes the mixing by raising and lowering the respective ends of the now enlarged compartment 26 and 28 as illustrated in FIG. 6. This mixing process is continued approximately for 1 minute.

After the completion of the mixing of the two parts of the resin system, the other clip 22 is removed and the mixed resin is allowed to pass into contact with and to soak the bandage in the compartment 24. The operator at this stage kneads the resin mix into intimate contact with as much of the wrapping as he can. In any case, the needle felt is extremely absorbent and will soak up the resin mix effectively wetting out all of the bandage. Effective and complete soaking of the bandage and therefore effective distribution of the resin is achieved without the operators hands having any possibility of contact with the resin and this represents a major advantage in this art. Also, there is no possibility of any spillage or loss of resin, or contamination by the resin as it remains within the sealed envelope. The quantities of the resin parts will of course be matched to the bandage size so that substantially all of the resin is absorbed by the bandage. The envelope therefore forms a metering device in containing the correct amount of resin for the bandage held thereby. In comparison, when the resin is applied to a bandage conventionally and in the open air, it is difficult to apply the resin effectively. If the resin is applied to a bandage before its use effective soaking of the bandage cannot be achieved without great care or by use of expensive equipment, or without mess and if the resin is applied after the bandage has been applied to, say, a pipeline, the resin can not be applied effectively, as it is difficult to make the resin penetrate through the whole thickness of the bandage layers in a homogeneous manner.

Figure 7:
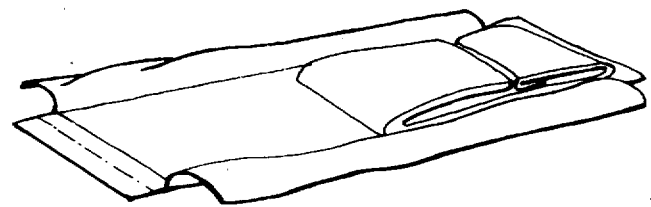
Figure 8:
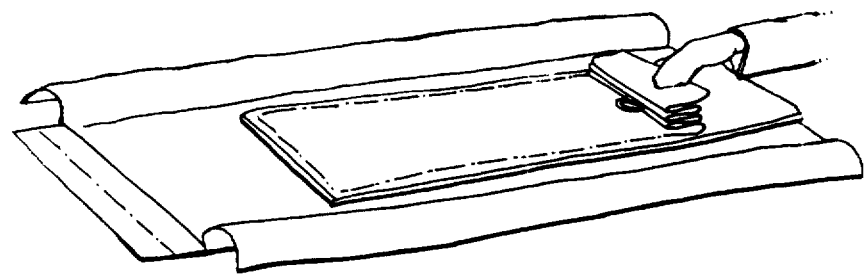
Figure 9:
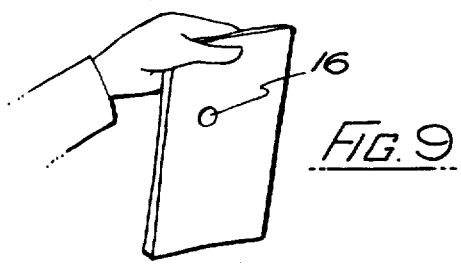
Figure 10:
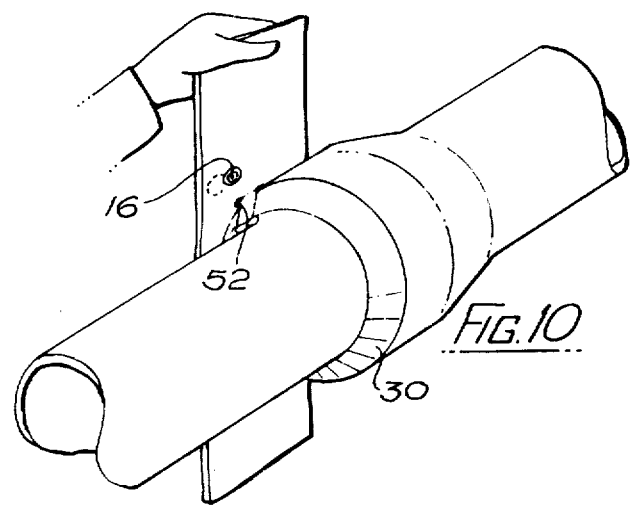
Figure 11:
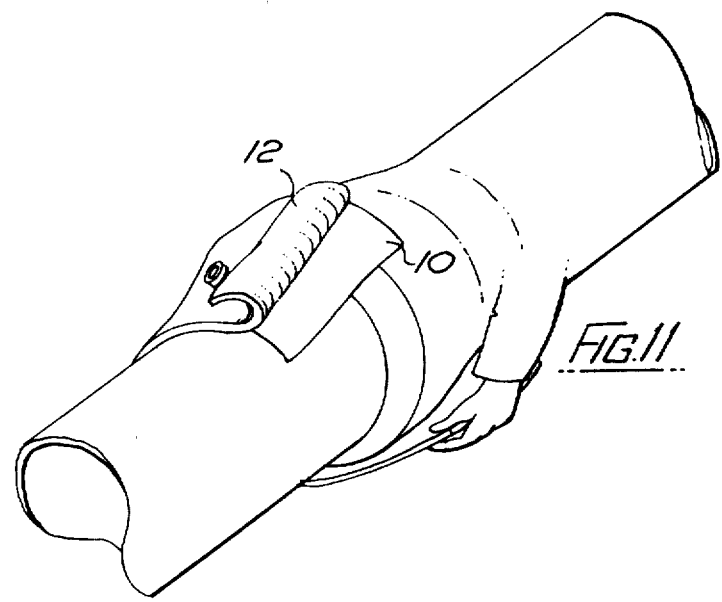

Upon completion of manipulating step to soak the bandage in resin, the operator now puts on the glove 40 and uses knife 42 to slit open the bag 20 as illustrated in FIG. 7, whilst the bag lies horizontally on the ground. This exposes the bandage as shown in FIG. 7 and he unfolds the bandage at one end and unfolds the film 10 which previously had been folded as shown in FIG. 7 so that it overlies the unfolded end of the bandage as shown in FIG. 8. Using his gloved hands, the operator applies excess resin to the surface to which the bandage is to be applied. Next, the other end of the bandage is folded concertina fashion so that he can grip the folded end as shown in FIG. 8. He then holds up the wrapping in suspended manner as shown in FIG. 9 with the vent tube 16 nearer the top and short edge of the bandage which as will be appreciated is of rectangular form.

The operator now applies the soaked bandage to the pipe joint with the collar 30 already attached as shown in FIG. 5, positioning the vent tube 16 in the gap 52. The collar 30 is located so that one of the shorter ends, the end which the operator is shown holding in FIG. 10, will lie on top of the pipeline. This end he opens out so that the film 10 is exposed, the layer 12 being folded back. The other end he now places in overlapping relationship with the film 10 thereby to complete the wrapping of the joint, and finally the folded over end of layer 12 is placed into overlapping relationship with said other end to complete the wrapping.

The wrapping strip 36 is now applied over the bandage as shown in FIG. 12. In applying the wrapping strip, the operator can take this over the vent tube 16 provided he continues to puncture the wrapping strip at the vent tube to permit the continued escape of the fluent gaseous medium being carried by the pipeline, avoiding the build up of internal pressure on the joints. The wrapping strip is applied initially to the smaller diameter of the pipe joint.

It is to be noted that this work must be performed within the cure time of the resin. The cure time can be controlled by the selection of the resin ingredients and the cure time should be neither too short nor too long consistant with the work to be performed.

When the resin has cured sufficiently, the line 16A is removed from the tube 16 to expose the clean inner threaded surface of the tube 16 and this is eventually plugged using the threaded plug 34 in order to complete the repair. The plug 34 is of course threaded into position but in alternative arrangements it may be cemented and/or hammered or forced into position. It is to be noted that the wrapping strip is applied to the bandage whilst the resin is still fluid, and being of a polyurethane film, applied under tension will compress the bandage onto the pipe.

By embodying a polyurethane film in the wrapping there is provided the advantage that the leaking gas will not tend to permeate through the wrapping as a whole, but will flow towards the outlet tube 16.

The outlet tube 16, its liner and in addition the plug 34 will preferably be of plastics material, and certainly the tube 16 should be such as to bond firmly and in an airtight manner to the film 10 and preferably also to the felt 12.

Although it will normally be desireable first of all to clean the outside of the pipeline where this is rough and uneven, or pitted or the like, in other cases initial preparation of the pipeline surface may not be necessary.

The method is inexpensive and efficient, and can be carried out very quickly by unskilled labour. The results are extremely encouraging, and it is to be noted that other resins, felt an plastics film material can be used without departing from the scope of the invention.

Although the embodiment of the invention described has illustrated the repair of a leak in a pipeline at a pipe joint, it is to be understood that the method can be applied at other locations in the pipeline other than at joints.

The concept of having a multi-part resin and a bandage or absorbent patch which is isolated but selectively connectable compartments of a sealed envelope is another aspect of the present invention, and this aspect has wider application than the specific application described. Thus, for other applications, the vent 16 may be omitted, and the soaked bandage can be used for joining pipes, for repairing pipes before use or pipes through which the flow of fluent medium has been temporarily suspended, when the bandage is in the form of a patch, for repairing motor vehicle bodies, household goods, vessel walls and the like. In each case, the sealed envelope contains in the appropriate compartments the resin parts in the correct quantity for the bandage in another of the envelope compartments and the resin parts are capable of being mixed in a first step and then the mixture applied to the bandage or patch in the second step, before the envelope is open, with all of the attendant advantages as set forth herein.

FIG. 13 shows an alternative embodiment of the invention in which an envelope 20A is provided, which is the same as the envelope 20 of FIG. 2. The envelope 20A is similarly compartmentalised as shown at 24A, 26A and 28A. Compartments 28A and 26A contain the same resin system parts as contained in compartments 28 and 26 in the FIG. 2 embodiment, and similar removable clips 22A/48A are provided to define the compartments 28A and 26A. A bandage 12A is provided in compartment 24A but the bandage 12A has no vent similar to vent 16 in bandage 12 of the FIG. 2 embodiment, nor has it any film 10, but otherwise the bandage 12A is the same as bandage 12.

The bandage 12A is impregnated by removing one clip 22 to intermix the resin parts and then to remove the second clip 22 to impregnate the bandage 12A before the envelope is opened, as described in relation to the previous figures. The bandage 12A can be used for joining pipes or for repairing leaks in pipes or for patching or repairing holes or wasted areas in any suitable substrate. The collar 30, plug 34 and bands 38 may not be required.

As in the previous embodiment, only the correct volumes of the resin parts for the size of bandage 12A are included in the compartments 28, 26.

I claim:

1. A pipeline repairing kit comprising
   (a) a sealed, flexible envelope;
   (b) two removable means dividing said envelope into at least first, second and third compartments, said means being removable selectively to connect the first and second and third compartments without opening the sealed envelope;
   (c) measured quantities of the parts of a two-part curable resin system in the first and second compartments; and
   (d) an enlongated flexible bandage member made of absorbent material disposed in said third compartment, said member including an integral closeable vent, whereby an elongated resin-soaked flexible bandage member adapted for wrapping around a pipeline can be provided by first removing the removable means between said first and second compartments to thereby mix the parts of the resin system, next removing the other removable means and bringing the mixed resin into intimate contact with said elongated flexible member, and then manually manipulating the envelope so as to thoroughly impregnate said bandage member with mixed resin before the envelope is opened.

* * * * *